(12) United States Patent
Marinov et al.

(10) Patent No.: US 8,667,877 B2
(45) Date of Patent: Mar. 11, 2014

(54) MITER SAW WITH DUAL TRACKING LIGHT

(75) Inventors: Plamen Marinov, Mount Prospect, IL (US); Gregory Alan Menze, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 12/910,351

(22) Filed: Oct. 22, 2010

(65) Prior Publication Data

US 2012/0097004 A1    Apr. 26, 2012

(51) Int. Cl.
*B26D 7/00*    (2006.01)
*B27B 5/20*    (2006.01)

(52) U.S. Cl.
USPC ............ 83/520; 83/521; 83/522.15; 83/468.3

(58) Field of Classification Search
USPC ........ 83/522.15, 520, 521, 471.3, 581, 468.3; 372/101, 107, 97
See application file for complete search history.

(56) References Cited

U.S. PATENT DOCUMENTS

| | | | |
|---|---|---|---|
| 5,285,708 A | 2/1994 | Bosten et al. | |
| 5,375,495 A | 12/1994 | Bosten et al. | |
| 6,397,717 B1 | 6/2002 | Waite | |
| 6,578,459 B2* | 6/2003 | Waite | 83/13 |
| 6,688,203 B2* | 2/2004 | Chen | 83/520 |
| 6,937,336 B2* | 8/2005 | Garcia et al. | 356/399 |
| 6,988,439 B2 | 1/2006 | Liu et al. | |
| 7,066,627 B1* | 6/2006 | Chen | 362/259 |
| 7,096,587 B2* | 8/2006 | Onose et al. | 30/390 |
| 7,284,335 B2 | 10/2007 | Park et al. | |
| 7,347,133 B2* | 3/2008 | Cheng et al. | 83/520 |
| 7,387,058 B2 | 6/2008 | Ushiwata et al. | |
| 7,398,719 B2 | 7/2008 | Peot et al. | |
| 7,418,894 B2 | 9/2008 | Ushiwata et al. | |
| 7,493,700 B2* | 2/2009 | Isele et al. | 33/286 |
| 7,926,398 B2* | 4/2011 | Garcia et al. | 83/520 |
| 8,186,067 B2* | 5/2012 | Onose et al. | 30/377 |
| 2004/0182215 A1* | 9/2004 | Ushiwata et al. | 83/522.15 |
| 2005/0098011 A1 | 5/2005 | Kao et al. | |
| 2005/0126356 A1 | 6/2005 | Garcia et al. | |

(Continued)

FOREIGN PATENT DOCUMENTS

EP    1586400 A1    10/2005
JP    2005335079 A   12/2005

OTHER PUBLICATIONS

International Search Report in corresponding PCT application (i.e., PCT/US2011/056615), completed Jan. 18, 2012 (10 pages).

*Primary Examiner* — Omar Flores Sanchez
(74) *Attorney, Agent, or Firm* — Maginot, Moore & Beck

(57) ABSTRACT

A motorized saw in one embodiment includes a work support surface, a cutting blade supported above the work support surface and defining a cutting plane extending through a center portion of the cutting blade, a light source configured to generate a beam of light, a first reflector aligned with a first path in which a first portion of the beam of light travels and defining a first tracking line path along a first side of the cutting plane, the first reflector configured to move along and remain aligned with the first path, and a second reflector aligned with a second path in which a second portion of the beam of light travels and defining a second tracking line path along a second side of the cutting plane, the second reflector configured to move along and remain aligned with the second path.

21 Claims, 7 Drawing Sheets

(56) References Cited

U.S. PATENT DOCUMENTS

| | | | |
|---|---|---|---|
| 2005/0193881 A1* | 9/2005 | Liao et al. | 83/478 |
| 2006/0101969 A1 | 5/2006 | Garcia et al. | |
| 2008/0184861 A1* | 8/2008 | Takase | 83/471.3 |
| 2009/0158907 A1* | 6/2009 | Chiang et al. | 83/520 |
| 2012/0085214 A1* | 4/2012 | Koegel | 83/471 |
| 2012/0255414 A1* | 10/2012 | Koegel | 83/477.2 |

* cited by examiner

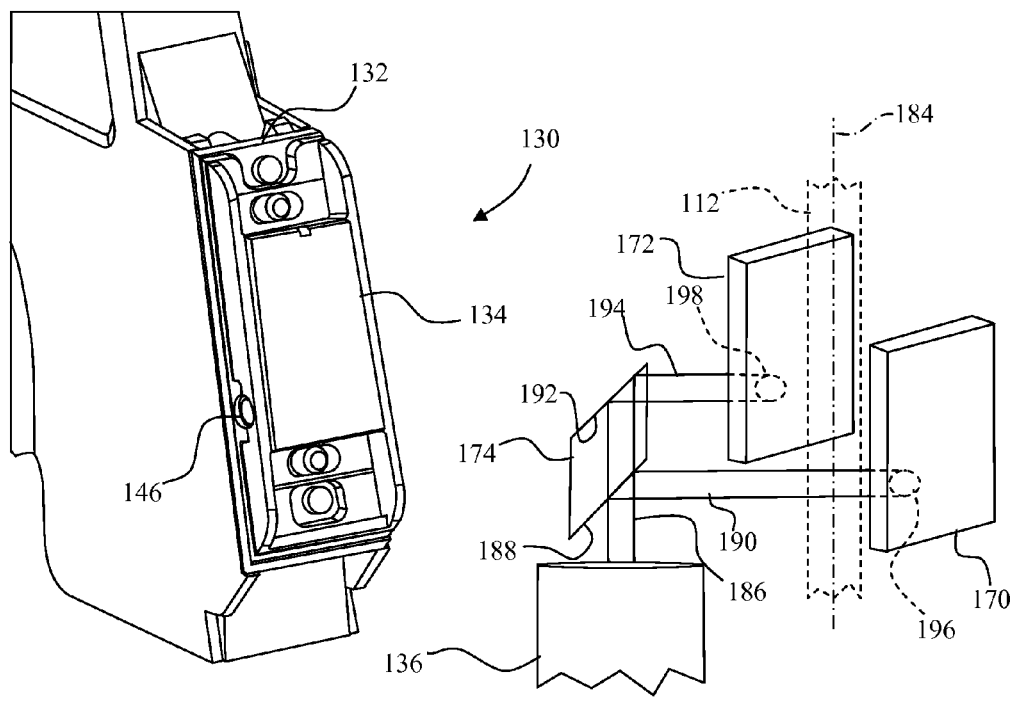
FIG. 3
FIG. 5
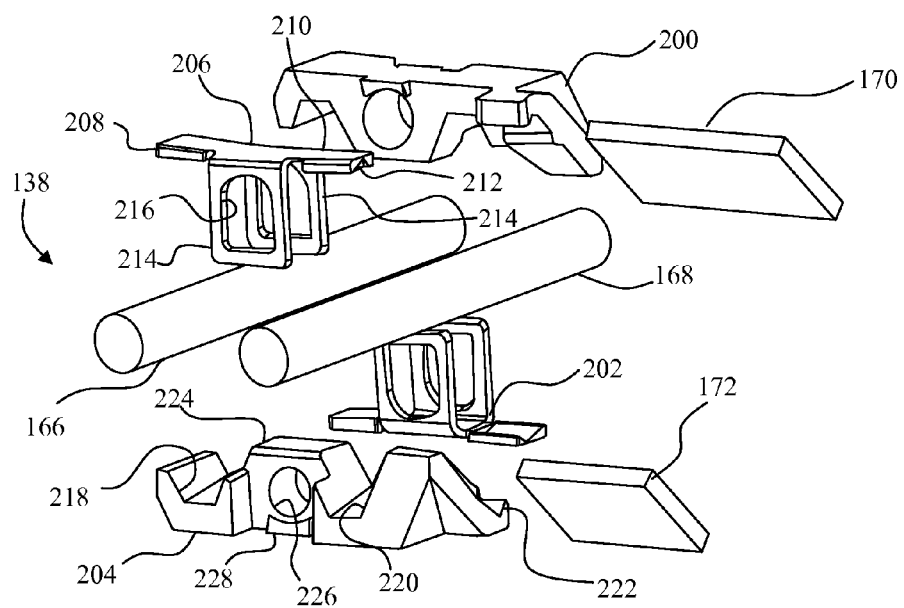
FIG. 6

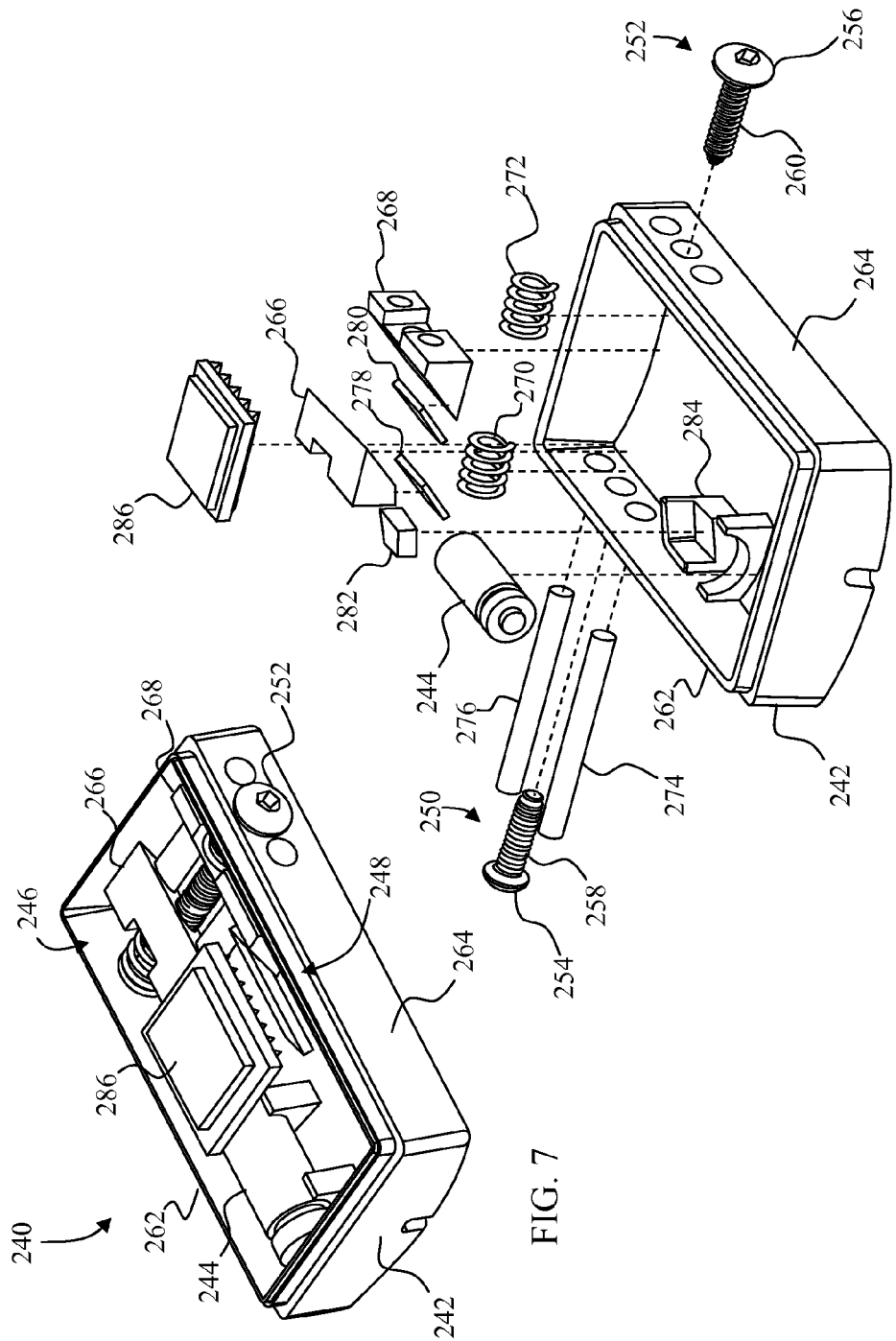

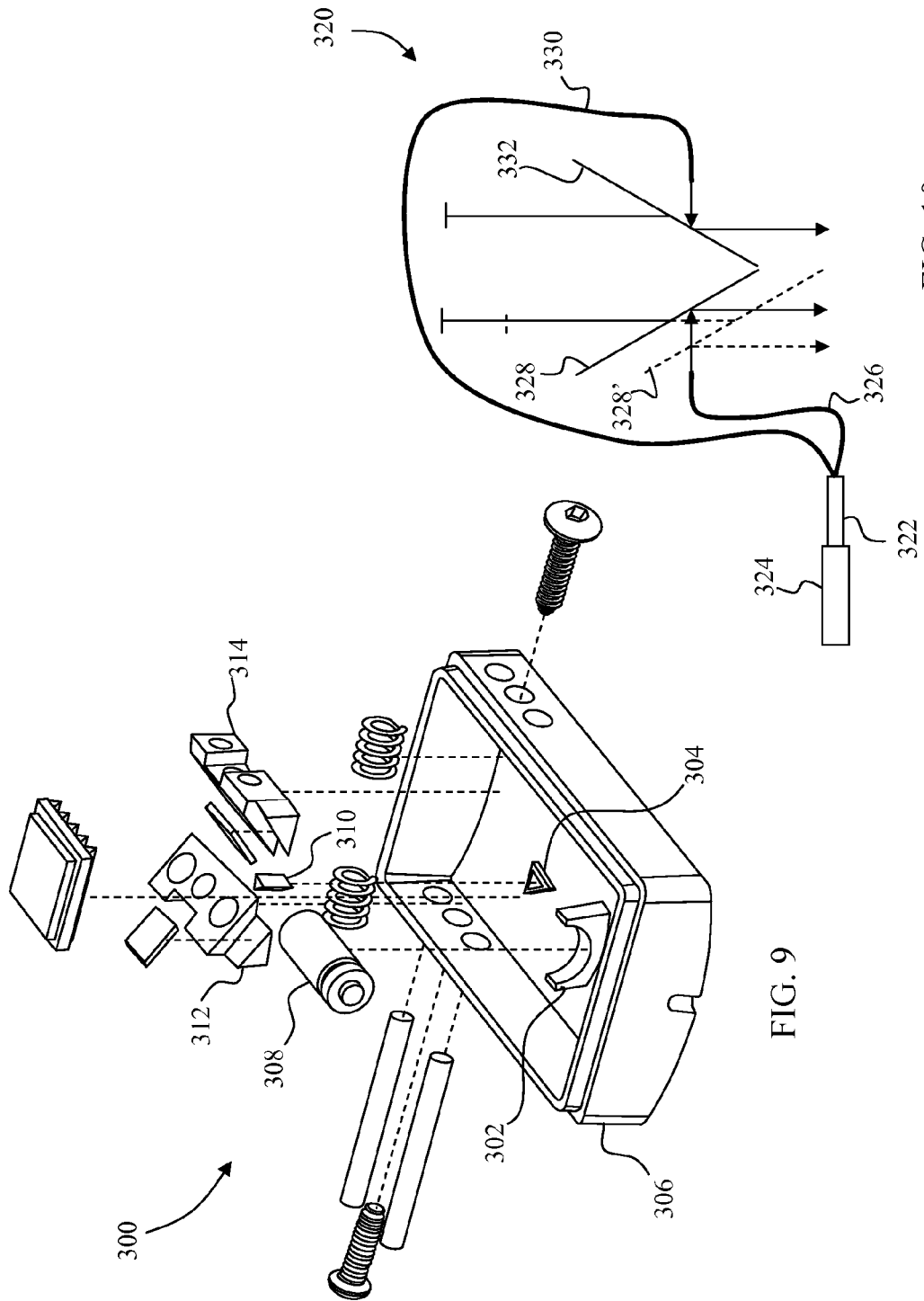

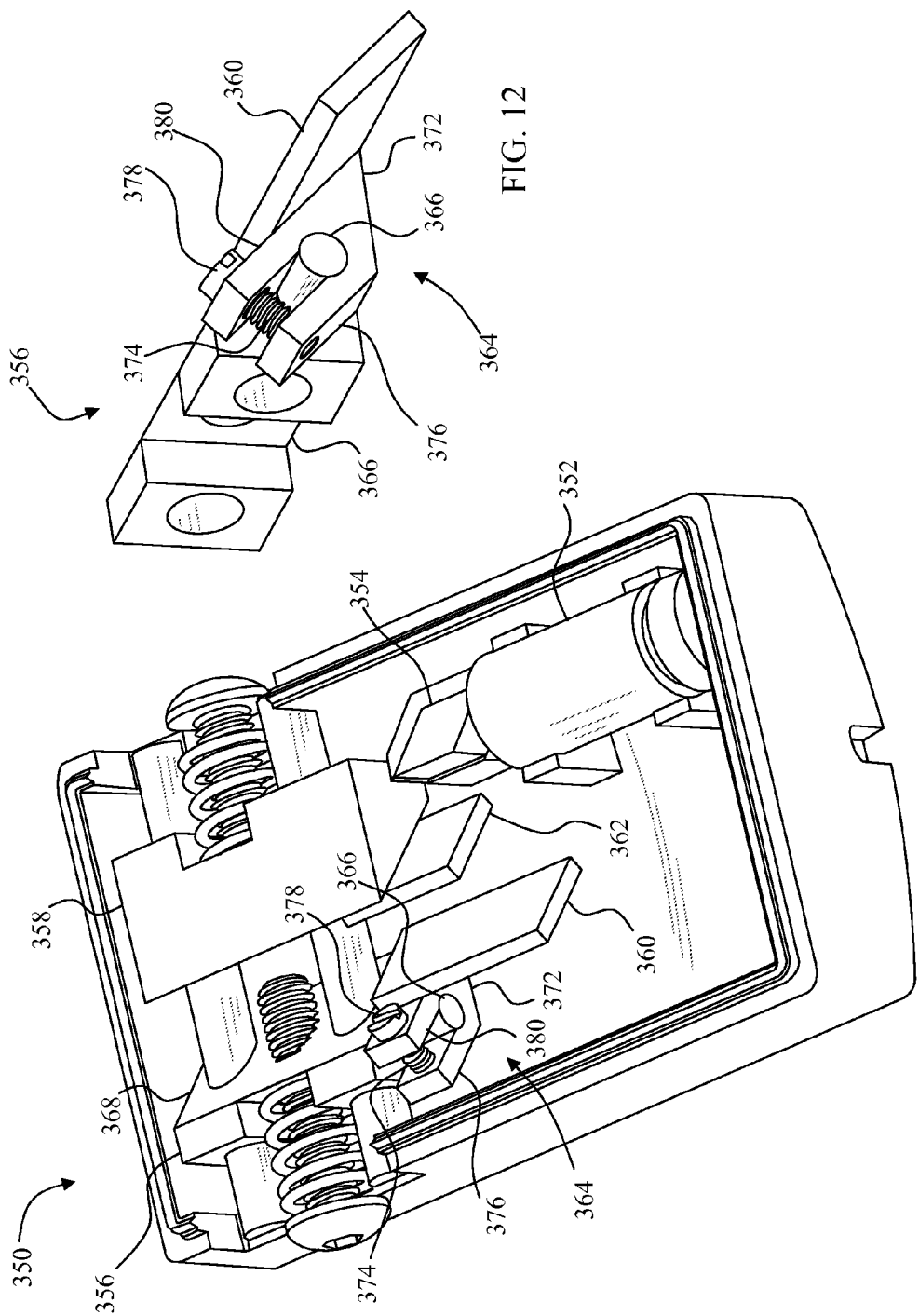

ated to generate one of the two tracking lines. The provision of a second lighting system increases the cost and complexity of the power tool.
MITER SAW WITH DUAL TRACKING LIGHT

FIELD

This application relates to the field of power tools and more particularly to power saws, such as power miter saws.

BACKGROUND

Power miter saws are typically used for sawing material, for example, construction lumber. The miter saws include a base or platform on which a turntable is positioned. The turntable is used to support a work piece thereon. A support assembly of the miter saw is connected to the turntable and functions to support a cutting assembly that is operable to perform a cutting operation on the work piece. The support assembly includes functionality that enables the cutting assembly to move upward and away from the turntable and downward toward the turntable in order to produce a cut. The support assembly also typically includes functionality to enable the cutting assembly to pivot in relation to the turntable in order to produce angled cuts. An example of such a miter saw is disclosed in U.S. Pat. No. 6,769,338 issued to Svetlik et al.

The ability to manipulate the angle at which a blade rotated by a miter saw cuts into a work piece makes the determination of the location on the work piece through which the blade will pass difficult. Envisioning the cut line is further complicated when the work piece that is to be cut is curved. In order to assist an operator in envisioning the cut line through a work piece, saw manufacturers have developed laser tracking devices that illuminate the location on a work piece that will be cut by a blade. In some instances, the tracking system provides a single line that approximates the width or blade. Projection of the tracking line onto a work piece thus allows an operator to envision the groove or "kerf" that will be formed in the work piece as material is removed by the blade. Different blades, however, have different widths. Thus, a tracking line that has a width appropriate for one blade may not accurately depict the kerf formed by another blade. Moreover, single tracking line systems are also limited in that the tracking line must be projected onto a work piece located directly beneath the blade. Accordingly, the light source must be displaced in some fashion which can introduce complexity and potential errors into the system.

In order to provide increased tracking line accuracy without the potential errors associated with single tracking line systems, manufacturers have developed dual tracking line systems. Typically, dual tracking line systems incorporate two separate lighting systems, with each system dedicated to generating one of the two tracking lines. The provision of a second lighting system increases the cost and complexity of the power tool.

In view of the foregoing, it would be desirable to provide a miter saw with an improved tracking system. It would also be desirable to provide a miter saw with an improved tracking system requiring only one light source. Additionally, it would be desirable to provide an improved tracking system with increased accuracy even when using blades of differing widths. While it would be desirable to provide a miter saw that provides one or more of these or other features, the teachings disclosed herein extend to those embodiments which fall within the scope of the appended claims, regardless of whether they accomplish one or more of the above-mentioned advantages or include one or more of the above-mentioned features.

SUMMARY

In one embodiment, a motorized saw in one embodiment includes a work support surface, a cutting blade supported above the work support surface and defining a cutting plane extending through a center portion of the cutting blade, a light source configured to generate a beam of light, a first reflector aligned with a first path in which a first portion of the beam of light travels and defining a first tracking line path along a first side of the cutting plane, the first reflector configured to move along and remain aligned with the first path, and a second reflector aligned with a second path in which a second portion of the beam of light travels and defining a second tracking line path along a second side of the cutting plane, the second reflector configured to move along and remain aligned with the second path.

In a further embodiment, a motorized saw includes a work support surface, a cutting blade pivotably supported above the work support surface and defining a cutting plane extending through a center portion of the cutting blade, a light source configured to generate a beam of light, a first reflector aligned with a first path in which a first portion of the beam of light travels and configured to move along a first axis perpendicular to the cutting plane while remaining aligned with the first path, and a second reflector aligned with a second path in which a second portion of the beam of light travels and configured to move along the first axis while remaining aligned with the second path.

The above described features and advantages, as well as others, will become more readily apparent to those of ordinary skill in the art by reference to the following detailed description and accompanying drawings. While it would be desirable to provide a miter saw arrangement that provides one or more of these or other advantageous features, the teachings disclosed herein extend to those embodiments which fall within the scope of the appended claims, regardless of whether they accomplish one or more of the above-mentioned advantages or include one or more of the above-mentioned features.

BRIEF DESCRIPTION OF THE DRAWINGS

FIG. 3 depicts a partial front perspective view of the miter saw assembly of FIG. 1 showing the LASER tracking system module;

FIG. 5 depicts the pathways of a beam of light generated by the light generator and split by a beam splitter of the lighting assembly of FIG. 3;

FIG. 6 depicts an exploded view of the carriages and support rods of the lighting assembly of FIG. 4;

FIG. 7 depicts a perspective view of an alternative embodiment of a lighting assembly that can be used with the miter saw assembly of FIG. 1;

FIG. 8 depicts an exploded perspective view of the lighting assembly of FIG. 7;

FIG. 9 depicts an exploded perspective view of an alternative embodiment of a lighting assembly that can be used with the miter saw assembly of FIG. 1;

FIG. 10 schematically depicts a lighting assembly incorporating a fiber optic beam splitter wherein the reflectors move along paths that are not parallel with the path of a light beam portion FIG. 11 depicts a perspective view of an alternative embodiment of a lighting assembly that can be used with the miter saw assembly of FIG. 1; and FIG. 12 depicts a carriage assembly of FIG. 11 incorporating an adjustment mechanism for modifying the plane along which a reflected incoming beam portion is reflected.

DESCRIPTION

Figure 1:
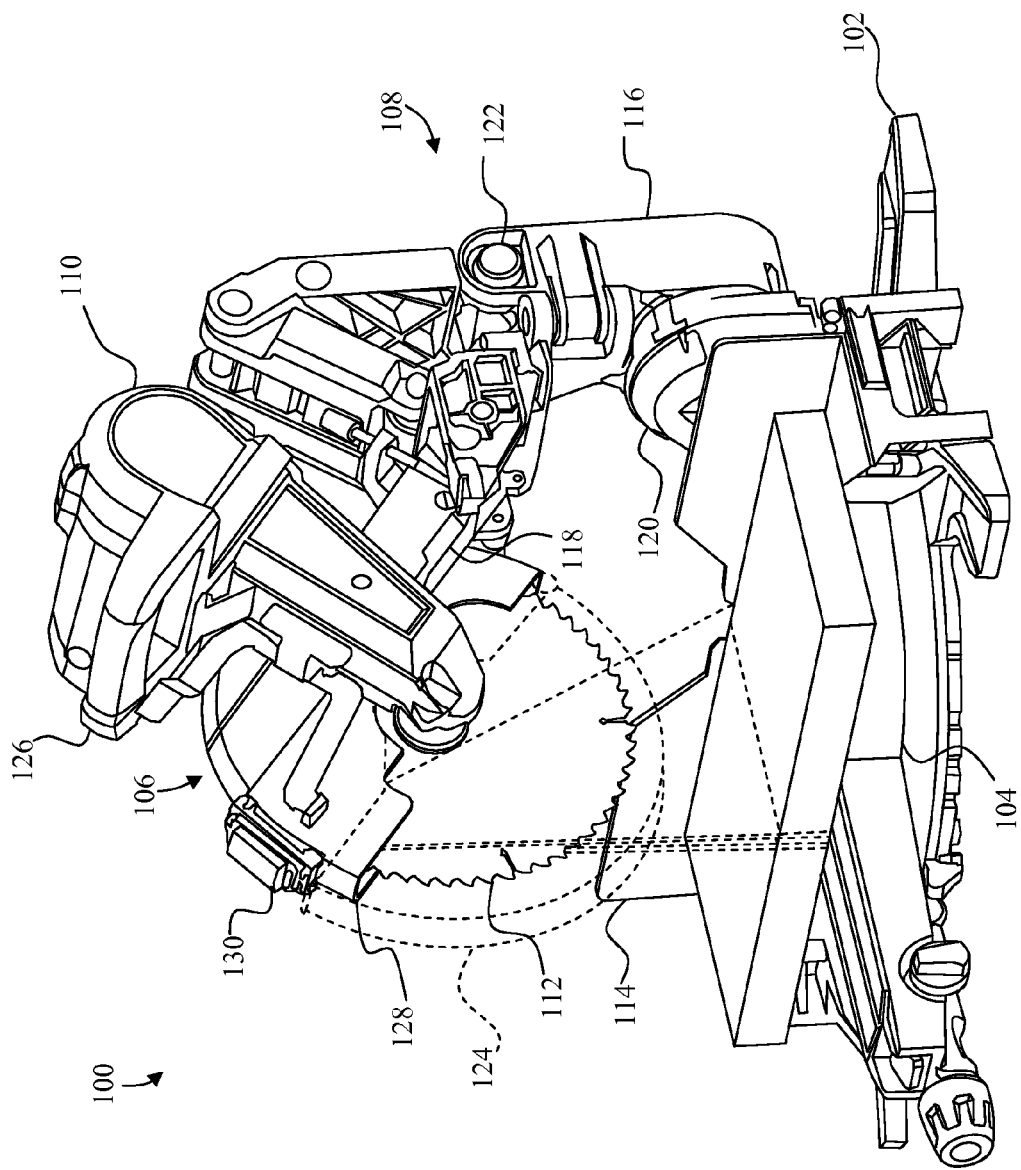
FIG. 1 depicts a front right perspective view of a miter saw assembly.
Figure 2:
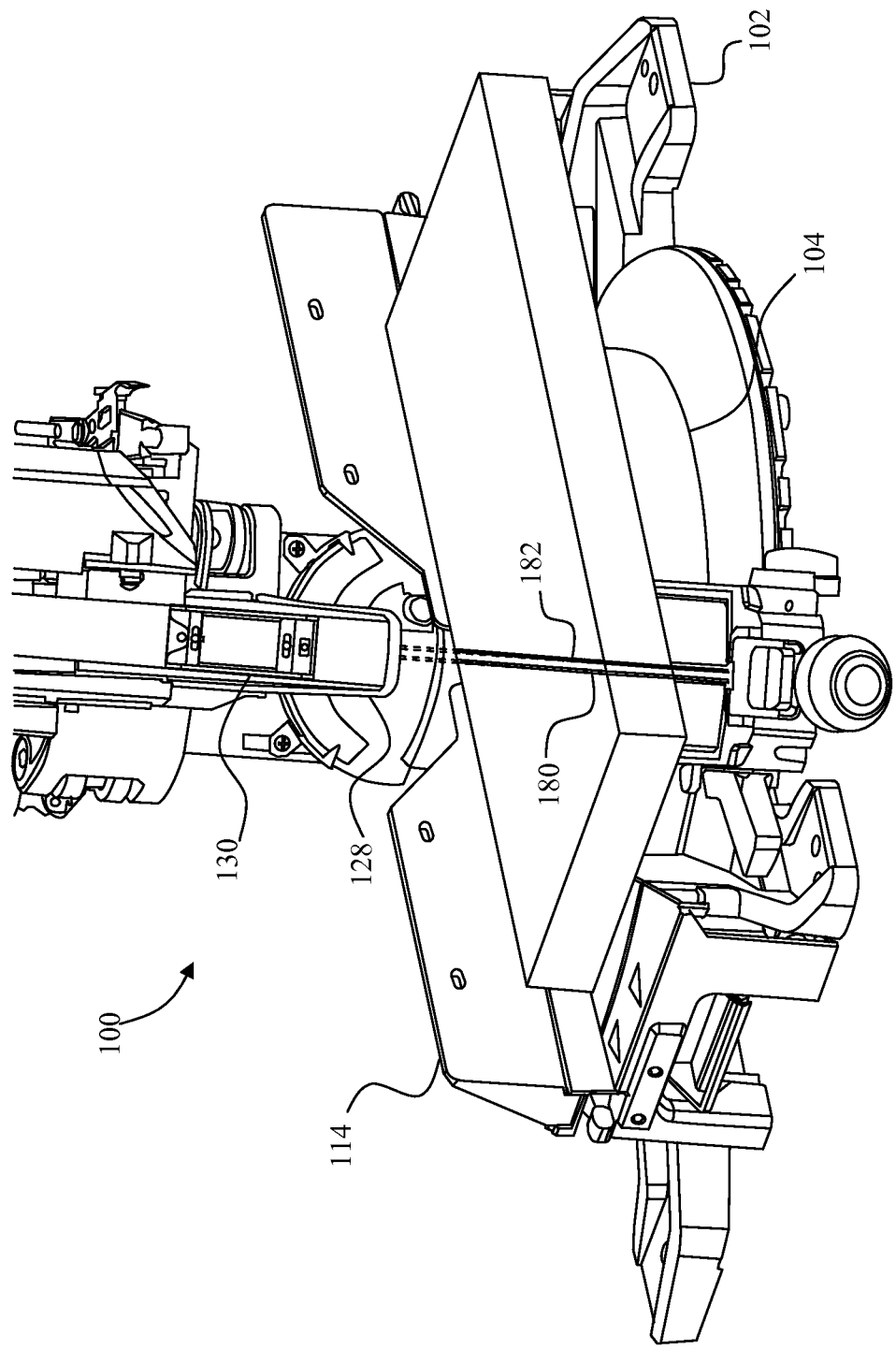
FIG. 2 depicts a partial front left perspective view of the miter saw assembly of FIG. 1 with the cutting blade removed showing two tracking lines projected onto a work piece.

Referring now to FIGS. 1-2, there is shown a miter saw assembly 100. The miter saw assembly 100 includes a base 102 and a turntable 104 that is rotatable on the base 102. The miter saw assembly 100 further includes a cutting head 106 mounted on a cutting head support assembly 108. The cutting head 106 (which may also be referred to herein as a "cutting assembly") includes a motor 110 that is operable to rotate a circular saw blade 112. The cutting head support assembly 108 is attached to the turntable 104 and configured to support the cutting head 106 such that the cutting head 106 may move over the turntable 104 and perform cutting operations on a work piece supported by the turntable 104. A rip fence 114 attached to the turntable 104 may be used to align a work piece thereon.

The cutting head support assembly 108 includes a bevel arm 116, a cutting arm 118, a first pivot mechanism 120, and a second pivot mechanism 122. The bevel arm 116 (also referred to herein as a "bevel post") provides a bevel support structure for the miter saw assembly 100. The bevel arm 116 is pivotally attached to the turntable 104 by the first pivot mechanism 120. The first pivot mechanism 120 includes a hinge arrangement that enables the bevel post 116 of the support assembly 108 to pivot with respect to the turntable 104 during a setup procedure. In particular, this arrangement is configured to enable the bevel post 116 to pivot from a vertical position (as shown in FIGS. 1-2) to an angle of 45° (not shown) or more in the leftward direction prior to a cutting operation. This pivoting allows the blade 112 of the cutting assembly 106 to approach the table 104 from a bevel angle and perform angled cuts on a work piece supported on the table 104, as is well known in the art.

The cutting arm 118 of the support assembly 108 provides a support for the cutting assembly 106. The cutting arm 118 is pivotably connected to the bevel arm 116 via the pivot mechanism 122. The pivot mechanism 122 enables pivoting movement of the cutting assembly 106 in relation to the turntable 104 and the base 102 during a cutting operation. This pivoting allows the blade 112 of the cutting assembly 106 to move toward and away from the horizontal turntable 104 to perform a cutting operation. In some embodiments, the cutting arm may be configured to alternatively or additionally allow movement of the cutting assembly along the cutting arm.

The cutting assembly 106 includes a handle 126 connected to the cutting arm 118 to facilitate movement of the cutting assembly 106 in relation to the turntable 104. The handle 126 is designed and dimensioned to be grasped by a human hand when performing a cutting operation. This allows the user to easily pivot the cutting assembly 106. A switch (not shown) may be provided on the handle 126 to allow the user to easily energize and de-energize the electric motor 110 during a cutting operation. A blade guard 128 covers the top portion of the circular saw blade 112. A lower blade guard 124, shown in shadow for purpose of clarity, is rotatably mounted to the cutting head assembly 106. The lower blade guard 124 is configured to rotate in a clockwise direction with respect to the cutting head assembly 106 when the cutting head assembly 106 is pivoted toward the turntable 104 thereby exposing the circular saw blade 112.

A lighting assembly 130 is located on the blade guard 128. The lighting assembly 130, also shown in FIG. 3, includes a base 132 and a cover 134. The base 132 is used to connect the lighting assembly 130 over an opening (not shown) in the blade guard 128. The lighting assembly 130 may be friction fit, adhered to, or fastened to the blade guard 128. The base 132 further supports other components (described below) of the lighting assembly 130 while the cover 134 prevents dust and other contaminants from interfering with the operation of the other components.

Figure 4:
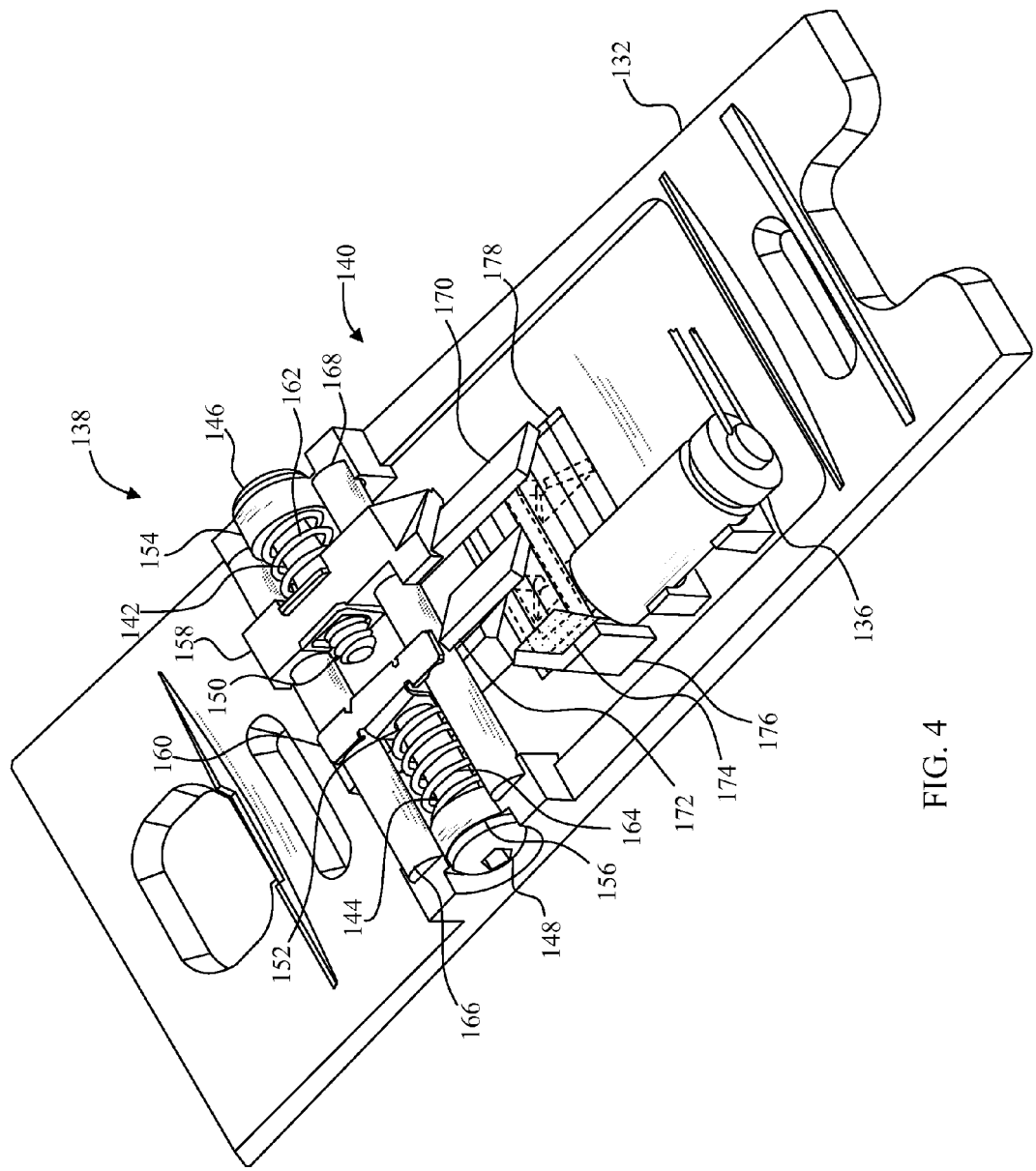
FIG. 4 depicts perspective view of the lighting assembly of FIG. 3 with the dust cover removed.

With reference to FIG. 4, components supported by the base 132 include a light source 136, a carriage support assembly 138 and an optics group 140. The light source 136 in one embodiment includes a laser generator. The laser generator may be, for example, a laser LED that emits a narrow beam of red light. Although a laser LED is provided in one embodiment, other light sources and arrangements can be used. By way of example, regular LEDs or incandescent light sources may be used.

The carriage support assembly 138 includes two alignment screws 142 and 144. The alignment screws 142 and 144 each include a head portion 146/148 and a threaded portion 150/152, respectively. The head portions 146/148 are rotatably constrained by flanges 154/156 of the base 132. The flanges 154/156 allow the alignment screws 142 and 144 to rotate while constraining the alignment screws 142 and 144 from moving axially into, and in some embodiments out of, the lighting assembly 130. The head portions 146/148 are accessible from outside of the lighting assembly 130 when the cover 134 is installed (see, e.g., FIG. 3).

The threaded portions 150/152 of the alignment screws 142 and 144 are threadedly engaged with carriages 158 and 160, respectively. A spring 162 biases the carriage 158 away from the flange 154 while a spring 164 biases the carriage 160 away from the flange 156. The load on the carriages 158 and 160 and alignment screws 142 and 144 provided by the springs 162 and 164 reduces movement of the carriages 158 and 160 and inhibits rotation of the alignment screws 142 and 144 unless movement is forced by a user as described more fully below.

The carriages 158/160 are movably supported by a pair of support rods 166 and 168. The support rods 166 and 168 in this embodiment have a circular cross-section, although other cross-sectional shapes may be used as desired. The support rods 166 and 168 are in turn supported by the base 132. The carriages 158/160 support a respective reflector 170/172. The reflectors 170 and 172 are part of the optics group 140 along with a beam splitter 174, which is supported by a beam splitter support 176, and a line generating lens 178. The line generating lens 178 may be, for example, a Fresnel, rod, or cylindrical lens.

The light source 136 and the optics group 140 are configured to project two tracking lines 180 and 182 onto a work piece positioned on the turntable 104 as depicted in FIG. 2. The manner in which the tracking lines 180 and 182 are projected onto the work piece or turntable 104 is described with reference to FIG. 5 wherein the cutting blade 112 is shown in shadow form. The center of the cutting blade 112 defines a cutting plane 184. Also shown in FIG. 5 is the light source 136 which, when energized, emits a light beam 186. A front face 188 of the beam splitter 174 is aligned with the path along which the light beam 186 travels and configured to reflect a portion 190 of the light beam 186 along a path perpendicular to the cutting plane 184. The back face 192 of the beam splitter 174 is aligned with the path along which the light beam 186 travels and configured to reflect a portion 194 of the light beam 186 which is not reflected by the front face 188 along a path perpendicular to the cutting plane 184 and spaced apart from the portion 190 of the light beam 186.

The reflector 170 is aligned with the path of the portion 190 of the light beam 186 and configured to reflect the portion 190 of the light beam 186 toward the line generating lens 178 along a tracking line path 196 which extends parallel to the cutting plane 184. The reflector 172 is aligned with the path of the portion 194 of the light beam 186 and configured to reflect the portion 194 of the light beam 186 toward the line generating lens 178 along a tracking line path 198 which extends parallel to the cutting plane 184. The tracking line path 198 is thus parallel to the tracking line path 196 but on a side of the cutting plane 184 opposite to the side on which the tracking line path 196 is located.

The line generating lens 178 is oriented such that the light beam portions 190 and 194 are spread in planes parallel to the cutting plane 184. The light beam portions 190 and 194 are thus projected beneath the blade guard 128 as parallel tracking lines 180 and 182, respectively. The location and spacing of the tracking lines 180 and 182 is controlled by the alignment screws 142 and 144 as described below.

Specifically, the alignment screw 142 is constrained from axial movement by the flange 154 and is threadedly coupled with the carriage 158. The carriage 158 in turn is constrained from rotation by the support rods 166 and 168. Accordingly, as the alignment screw 142 is rotated, the carriage 158 is forced to move along the support rods 166 and 168. The reflector 170 is thus moved along a path defined by the support rods 166 and 168. Because the support rods 166 and 168 are positioned to be parallel to the path of the portion 190 of the light beam 186, the reflector 170 is maintained in alignment with the path of the portion 190 of the light beam 186 as the carriage 158 moves along the support rods 166 and 168. Consequently, rotation of the alignment screw 142 causes the tracking line 180 to move toward or away from the tracking line 182 while maintaining the tracking line 180 parallel with the cutting plane 184.

Similarly, the alignment screw 144 is constrained from axial movement by the flange 156 and is threadedly coupled with the carriage 160. The carriage 160 in turn is constrained from rotation by the support rods 166 and 168. Accordingly, as the alignment screw 144 is rotated, the carriage 160 is forced to move along the support rods 166 and 168. The reflector 172 is thus moved along a path defined by the support rods 166 and 168. Because the support rods 166 and 168 are positioned to be parallel to the path of the portion 194 of the light beam 186, the reflector 172 is maintained in alignment with the path of the portion 194 of the light beam 186 as the carriage 160 moves along the support rods 166 and 168. Consequently, rotation of the alignment screw 144 causes the tracking line 182 to move toward or away from the tracking line 180 while maintaining the tracking line 182 parallel with the cutting plane 184.

The tracking lines 180 and 182 are thus independently adjustable to a desired location. This allows an operator to set the positions of the tracking lines 180 and 182 to a desired spacing. Typically, the tracking lines 180 and 182 will be set adjacent to the opposite sides of the cutting blade 112. Accordingly, the tracking lines 180 and 182 will extend over the entire surface of a work piece positioned on the turntable 104. Moreover, because the lighting assembly 130 is positioned on the portion of the blade guard 128 closest to the user, the tracking lines 180 and 182 typically extend over the edge of work pieces positioned on the turntable 104 as depicted in FIG. 1. Additionally, because the lighting assembly 130 is mounted to the blade guard 128, the tracking lines 180 and 182 remain projected on the work piece as the cutting head assembly 106 is pivoted toward the work piece.

In the embodiment of FIG. 4, the carriages 158 and 160 are two piece assemblies as shown more clearly in FIG. 6. The carriage 158 includes a carriage base 200 and a wing clip 202. The carriage 160 includes a carriage base 204 and a wing clip 206. The features of the carriage base 200 and wing clip 202 are similar to the features of the carriage base 204 and wing clip 206 and are described with reference to the carriage base 204 and wing clip 206.

The wing clip 206 includes two wings 208 and 210. A cutout 212 is located in the wing 210. Two clips 214 extend from a central portion of the wing clip 206. Each of the clips defines a respective opening 216. The carriage base 204 includes two channels 218 and 220. A support ledge 222 extends from a location adjacent to the channel 220. A central portion 224 of the carriage base 204 defines a through hole 226. A protrusion 228 is located next to the through hole 226.

Assembly of the carriages 158 and 160 is similar and is described with reference to the carriage 160. Initially, the support rods 166/168 are received into the channels 218/220, respectively. Additionally, the reflector 172 is positioned on the support ledge 222. The wing clip 206 is then positioned with one of the clips 214 on either side of the central portion 224 (see FIG. 6) and the wing clip 206 is lowered onto the carriage base 204. As the clips 214 approach the protrusions 228 (a complementary protrusion 228, not shown, is provided on the opposite side of the carriage base 204) the protrusions 228 force the clips 214 to spread apart. Once the distal ends of the clips 214 progress past the protrusions 228, the clips 214 snap back toward each other and engage the distal ends of the protrusions 228.

As the distal ends of the clips 214 progress past the protrusions 228, the cutout 212 comes into contact with the reflector 172, pressing the reflector 172 against the support ledge 222 and holding the reflector 172 in place. Additionally, the wings 208 and 210 are positioned above the support rods 166/168, respectively. Thus, the support rods 166/168 are maintained within the channels 218/220, respectively. Moreover, the openings 216 are substantially aligned with the through hole 226.

The dimensions of the wing clip 206 and the carriage base 204 are selected such that in the assembled configuration described above, the threaded portion 152 of the alignment screw 144 can be inserted through the through hole 226 and the openings 216 while engaging the clips 214. Thus, rotation of the alignment screw 144 causes axial movement of the carriage 160 as described above. Additionally, the depth of the channels 218/220 and the location of the wings 208/210 above the channels 218/220 is selected such that a minimum amount of clearance is provided for the support rods 166 and 168. Accordingly, the carriage 160 can move freely along the support rods 166/168 without allowing undue movement of the carriage 160 when subjected to vibrations typical of a motorized tool.

An alternative lighting assembly 240 is shown in FIGS. 7 and 8 and includes a base 242, a light source 244, a carriage support assembly 246 and an optics group 248. The carriage support assembly 246 includes two alignment screws 250 and 252. The alignment screws 250 and 252 each include a head portion 254/256 and a threaded portion 258/260, respectively. The head portions 254/256 are rotatably constrained by side walls 262/264. The side walls 262/264 allow the alignment screws 250 and 252 to rotate while constraining the alignment screws 250 and 252 from moving axially into the base 242.

The threaded portions 258/260 of the alignment screws 250 and 252 are threadedly engaged with carriages 266 and 268, respectively. A spring 270 biases the carriage 266 away from the sidewall 262 while a spring 272 biases the carriage 268 away from the sidewall 264. The load on the carriages 266 and 268 and alignment screws 250 and 252 provided by the springs 270 and 272 inhibits movement of the carriages 266 and 268 and rotation of the alignment screws 250 and 252.

The carriages 266/268 are movably supported by a pair of support rods 274 and 276. The support rods 274 and 276 in this embodiment have a circular cross-section, although other cross-sectional shapes may be used as desired. The support rods 274 and 276 are in turn supported by the side walls 262/264. The carriages 266/268 support a respective reflector 278/280. The reflectors 278 and 280 are part of the optics group 248 along with a beam splitter 282, which is supported by a beam splitter support 284, and a line generating lens 286.

The components of the lighting assembly 240 are aligned and operated much in the same manner as described above with respect to the lighting assembly 130 of FIG. 4. One difference is that the base 242 of the lighting assembly 240 in this embodiment further functions as a dust cover. Thus, the base 242 may be connected directly to a blade guard. Additionally, the carriages 266/268 are single piece units. Accordingly, the support rods 244/226 are inserted through bores in the carriages 266/268. Furthermore, the reflectors 278/280 are connected to the carriages 266/268 using, for example, an adhesive.

Other variations to the structure of the lighting assembly 130 may be desired in different embodiments. For example, in one embodiment, a light source is configured to emit a light beam along a path perpendicular to the cutting plane of a tool. In such embodiments, a beam splitter is not always needed. For example, a first reflector may be aligned with one portion of the light beam and a second reflector may be aligned with the portion of the light beam that is not aligned with the first reflector. Alternatively, a beam splitter may be incorporated as depicted in the lighting assembly 300 of FIG. 9.

The lighting assembly 300 is substantially the same as the lighting assembly 240. The light source support 302 and the beam splitter support 304 are located more centrally in the base 306 as compared with the configuration of the lighting assembly 240. Accordingly, as the light source 308 emits a beam of light, the beam of light is reflected off of adjacent surfaces of the beam splitter 310 creating two light beam portions that are travelling along a single axis albeit in opposite directions. The carriages 312 and 314, which are mirror images of each other, are then positioned to cause the oppositely travelling lights beam portions to be reflected along parallel paths.

While the foregoing embodiments are configured to move the reflectors along paths that are parallel to the path of the light beam portion which is being reflected, the reflectors in some embodiments are configured to move along a path that is not parallel to the path of the light beam portion which is being reflected. In such embodiments, it may be useful to incorporate a fiber optic beam splitter to obtain two beam portions that are travelling on the same axis but toward the origin of the opposing beam portion as depicted in FIG. 10. FIG. 10 schematically depicts a lighting system 320 including a fiber optic beam splitter 322 which splits a light beam from a light source 324.

A first fiber optic 326 directs a portion of the emitted light beam to an independently controlled reflector 328. A second fiber optic 330 directs another portion of the emitted light beam to an independently controlled reflector 332. The independently controlled reflectors 330/332 can be moved along pathways that are perpendicular to the path of the light beam portions emitted from the fiber optics 326/330. Thus, when the independently controlled reflector 328 is moved to the location indicated by independently controlled reflector 328', the reflected light beam portion moves away from the reflected light beam portion from the independently controlled reflector 330.

Other modifications are also contemplated within the scope of the following claims. In the lighting assemblies 130, 240 and 300, the carriages are configured to establish the proper angle of the reflectors mounted thereon with respect to the light beam paths to reflect the light beam portions along a plane substantially perpendicular to the plane defined by the turntable 104. In some embodiments, the precision required to ensure the desired configuration of components is alleviated by incorporating an adjustment mechanism into the lighting assembly. By way of example, lighting assembly 350 of FIGS. 11 and 12 depict a lighting assembly 350 that incorporates one or more adjustable carriages.

The lighting assembly 350 is substantially the same as the lighting assemblies 130, 240 and 300 including a light source 352, a beam splitter 354, and two carriage assemblies 356 and 358 which support two reflectors 360 and 362, respectively. The lighting assembly 350 further includes an adjustment mechanism 364.

The adjustment mechanism 364 includes a post 366 extending outwardly from a main body 368 of the carriage 352. The reflector 360 is mounted to a clip 372 which is in turn rotatably supported by the post 366. A screw 374 threadedly engages one arm 376 of the clip 372 while a head 378 of the screw 374 rotatably bears against an opposing arm 380 of the clip 372.

In operation, a beam of light is generated by the light source 352 and the beam is split by the beam splitter 354. One portion of the split beam is directed to the reflector 362 and a second portion of the split beam is directed toward the reflector 360. The reflectors 360 and 362 in turn redirect the incoming beam portions in an upward direction, as depicted in FIG. 11, toward a line generating lens (not shown).

In the event that the incoming beam portion reflected by the reflector 360 is not substantially perpendicular to the plane defined by the turntable 104, the screw 374 is rotated in a counterclockwise direction thereby reducing the clamping force of the clip 372 on the post 366. The clip 372 and the reflector 360 are then rotated about the post 366 until the incoming beam portion reflected by the reflector 360 is reflected along the desired plane.

Once the reflected beam is projected along the desired plane, the screw 374 is rotated in the clockwise direction. As the screw 374 is rotated in the clockwise direction, the head 378 rotates against the arm 380 while the screw 374 threadedly engages the arm 376. The arm 376 is thus pulled toward the arm 380, thereby increasing the clamping force of the clip 372 on the post 366. Rotation of the screw 374 is continued until the desired clamping force is achieved.

In some embodiments, both carriages are provided with an adjustment mechanism, thereby allowing an operator to modify the planes along which both of the split beam portions are projected.

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A motorized saw comprising:
a work support surface;
a cutting blade supported above the work support surface and defining a cutting plane extending through a center portion of the cutting blade;
a light source configured to generate a beam of light;
a first reflector aligned with a first beam path in which a first portion of the beam of light travels and defining a first tracking line path along a first side of the cutting plane, the first reflector configured to move linearly along a first linear path and to remain aligned with the first beam path; and
a second reflector aligned with a second beam path in which a second portion of the beam of light travels and defining a second tracking line path along a second side of the cutting plane, the second reflector configured to move linearly along a second linear path and to remain aligned with the second beam path, wherein the first beam path and the second beam path are substantially parallel.

2. The motorized saw of claim 1, further comprising;
a beam splitter aligned with the light source and defining the first beam path and the second beam path.

3. The motorized saw of claim 2, further comprising:
a line generating lens positioned to intersect the first tracking line path and the second tracking line path.

4. The motorized saw of claim 1, wherein the first reflector is configured to move non-rotationally along the first linear path.

5. The motorized saw of claim 4, wherein the second reflector is configured to move non-rotationally along the second linear path.

6. A motorized saw comprising:
a work support surface;
a cutting blade supported above the work support surface and defining a cutting plane extending through a center portion of the cutting blade;
a light source configured to generate a beam of light;
a first reflector aligned with a first path in which a first portion of the beam of light travels and defining a first tracking line path along a first side of the cutting plane, the first reflector configured to move along and remain aligned with the first path;
a second reflector aligned with a second path in which a second portion of the beam of light travels and defining a second tracking line path along a second side of the cutting plane, the second reflector configured to move along and remain aligned with the second path;
a first carriage supporting the first reflector, the first carriage configured to move the first reflector along the first path; and
a second carriage supporting the second reflector, the second carriage configured to move the second reflector along the second path.

7. The motorized saw of claim 6, further comprising:
a first adjustment screw threadedly engaged with the first carriage and rotatably supported in a fixed location by a base such that rotation of the first adjustment screw causes movement of the first carriage.

8. The motorized saw of claim 7, further comprising:
a second adjustment screw threadedly engaged with the second carriage and rotatably supported in a fixed location by the base such that rotation of the second adjustment screw causes movement of the second carriage.

9. The motorized saw of claim 7, wherein the first carriage is slidably mounted on a first support rod.

10. The motorized saw of claim 9, wherein the first carriage is slidably mounted on a second support rod.

11. The motorized saw of claim 10, wherein the rods extend perpendicularly to the cutting plane.

12. A motorized saw comprising:
a work support surface;
a cutting blade pivotably supported above the work support surface and defining a cutting plane extending through a center portion of the cutting blade;
a light source configured to generate a beam of light;
a first reflector aligned with a first path in which a first portion of the beam of light travels and configured to move along a first axis perpendicular to the cutting plane while remaining aligned with the first path;
a second reflector aligned with a second path in which a second portion of the beam of light travels and configured to move along the first axis while remaining aligned with the second path;
a first carriage supporting the first reflector, the first carriage configured to move the first reflector along the first path; and
a second carriage supporting the second reflector, the second carriage configured to move the second reflector along the second path.

13. The motorized saw of claim 12, further comprising:
a first adjustment screw threadedly engaged with the first carriage and rotatably supported in a fixed location by a base such that rotation of the first adjustment screw causes movement of the first carriage along the first axis.

14. The motorized saw of claim 13, further comprising:
a second adjustment screw threadedly engaged with the second carriage and rotatably supported in a fixed location by the base such that rotation of the second adjustment screw causes movement of the second carriage along the first axis.

15. The motorized saw of claim 14, wherein the first carriage is slidably mounted on a pair of support rods.

16. The motorized saw of claim 15, wherein the second carriage is slidably mounted on the pair of support rods.

17. The motorized saw of claim 16, further comprising;
a beam splitter aligned with the light source and defining the first path and the second path.

18. The motorized saw of claim 17, wherein the first reflector defines a first tracking line path and the second reflector defines a second tracking line path, the motorized saw further comprising:
a line generating lens positioned to intersect the first tracking line path and the second tracking line path.

19. The motorized saw of claim 12, further comprising:
a first adjustment mechanism configured to modify a plane along which the first portion of the beam of light is reflected by the first reflector.

20. The motorized saw of claim 19, wherein the first adjustment mechanism comprises:
a post extending outwardly from a carriage body, the carriage body movable along the first axis;
a clip rotatably positioned on the post, the clip supporting the first reflector; and
a screw extending through a first arm of the clip and threadedly engaged with a second arm of the clip.

21. The motorized saw of claim 19, further comprising:
a second adjustment mechanism configured to modify a plane along which the second portion of the beam of light is reflected by the second reflector.

* * * * *